US006243016B1

United States Patent
Hansen

(10) Patent No.: US 6,243,016 B1
(45) Date of Patent: Jun. 5, 2001

(54) SYSTEM AND A METHOD FOR MONITORING AND WARNING REGARDING THE PRESENCE OF MANUALLY AND TEMPORARILY FITTED GROUND CONNECTORS ON HIGH VOLTAGE CONDUCTORS, AS WELL AS A WARNING DEVICE AND A CONDUCTOR MEANS INCLUDED IN THE SYSTEM

(76) Inventor: Roger Hansen, Hemsveien 14, 3090 Hof i Vestfold (NO)

( * ) Notice: Subject to any disclaimer, the term of this patent is extended or adjusted under 35 U.S.C. 154(b) by 0 days.

(21) Appl. No.: 09/453,213

(22) Filed: Dec. 3, 1999

(30) Foreign Application Priority Data

Dec. 4, 1998 (NO) .................................... 985708

(51) Int. Cl.$^7$ .................................... G08B 21/00
(52) U.S. Cl. .................... 340/635; 340/539; 340/650; 324/133; 361/1
(58) Field of Search .................... 340/635, 649, 340/650, 539; 324/133; 361/1, 42

(56) References Cited

U.S. PATENT DOCUMENTS 4,897,606 * 1/1990 Cook et al. ................. 324/509

FOREIGN PATENT DOCUMENTS

| 31 25981 | 3/1983 | (DE) . |
| 0 298 203 | 1/1989 | (EP) . |

OTHER PUBLICATIONS

Patent Abstracts of Japan, Publication No. 09163534A dated Jun. 20, 1997.
RU 2015516–C1, High–voltage warning device for power lines—has fail–safe indicator circuitry ensuring correct warning signal.
Patent Abstracts of Japan, Publication No. 10142285A dated May 29, 1998.

* cited by examiner

Primary Examiner—Julie Lieu
(74) Attorney, Agent, or Firm—Wenderoth, Lind & Ponack, L.L.P.

(57) ABSTRACT

A system for warning regarding the presence of manually attached grounding contacts (21) on high voltage conductors (3), comprises
 a) a naked additional conductor (1) close to the high voltage conductor (3), however spaced therefrom, and with an ability to be clamped resiliently to contact with the high voltage conductor (3) when the grounding contact (21) is attached; and
 b) a warning device (20) having connection means (4, 5) to the high voltage conductor (3) and to the additional conductor (1).

The warning device has, in a part (24) arranged near the high voltage conductor (3), equipment for sensing whether the additional conductor (1) has been brought to contact with the high voltage conductor or not, and for transmitting a signal regarding this condition to another part (26) of the warning device which is remote from the high voltage conductor, preferably at ground potential. From this part (26) the signal can be transmitted to an operation central.

39 Claims, 8 Drawing Sheets

SYSTEM AND A METHOD FOR MONITORING AND WARNING REGARDING THE PRESENCE OF MANUALLY AND TEMPORARILY FITTED GROUND CONNECTORS ON HIGH VOLTAGE CONDUCTORS, AS WELL AS A WARNING DEVICE AND A CONDUCTOR MEANS INCLUDED IN THE SYSTEM

A system and a method for monitoring and warning regarding the presence of manually and temporarily fitted ground connectors on high voltage conductors. as well as a warning device and a conductor means included in the system.

The present invention relates in general to a system and a method for preventing accidents and destruction in installations having high voltage lines, and more particularly, the invention relates to a system and a method for monitoring and warning regarding the presence of temporarily and manually fitted grounding connectors on high voltage conductors. The invention also relates to a warning device and a conductor means Included in the system.

In connection with repair work, upgrading, revisions and controls of installation equipment in power, connector and transformer stations, and regarding outdoor power line equipment, it is obligatory, for safety reasons, to provide manual grounding of the high voltage lines that have been disconnected in advance. This means that personnel having to do work on installations or lines, themselves attach temporary contacts having a separate conductor to earth. E.g. in three-phase installations manual grounding is then mounted to each respective one of the three phase conductors as safety grounding, marker grounding or staff grounding. In most countries, the use of these types of manual grounding Is subject to strict governmental regulations. Prior to starting maintenance work, the operating personnel must give warning to the operation central. After finishing work, the groundings must be removed before the operation central is notified that the voltage can be switched in again.

Such manual attachment of a grounding contact may be made by attaching a sturdy clamp somewhere on a cable, or possibly by attaching a specially adapted connecting clamp on a connecting detail arranged for such a purpose on a high voltage rail conductor.

In the first place it is important to insure that such a manually mounted contact has actually been attached in such a manner that safety regulations are complied with. In some cases, imperfect attachment of manual grounding has resulted in personal injury. However, it is equally important to check that such manual groundings have been removed prior to putting the installation into operation again by switching in high voltage. Such a forgotten ground connection may then turn out to be very expensive for the power company/network company owning the installation, through the damage and the interruption in operating time that may be the result of a short-circuit through the ground connection when high voltage is switched in.

There is no system to be found in the market, that solves. In a satisfactory manner, the problem of safeguarding against such forgotten ground connections.

Thus, the primary goal of the present invention is to solve the problem stated above. Hence, in a first aspect of the invention, there is provided a system of the type defined in the appended claim 1.

In a second aspect of the invention, there Is provided a conductor means of the type defined in appended claim 10.

In a third aspect of the invention, there is provided a warning device of the type defined in appended claim 39.

Preferred embodiments of the second and third aspect of the invention appear from the dependent claims 3–9 and 11–38, respectively.

Hence, using the present invention, an option is achieved for warning about manual grounding to all parties concerned, in any manual revision/disconnecting procedure wherein manual grounding is required, and similarly when reversing-reswitching the installation. Thereby the parties involved can be certain that manual grounding has been attached prior to work start-up, and that it has been removed after work has ended. Experiments have Indicated that the system works quite well.

In the following, the aspects of the invention shall be described in more detail by presenting exemplary embodiments, and in this connection it is referred to the appended drawings illustrating such examples, and wherein FIG. 1 shows manually operated attachment of a grounding clamp for a high voltage cable. In accordance with prior art;

Figure 1:
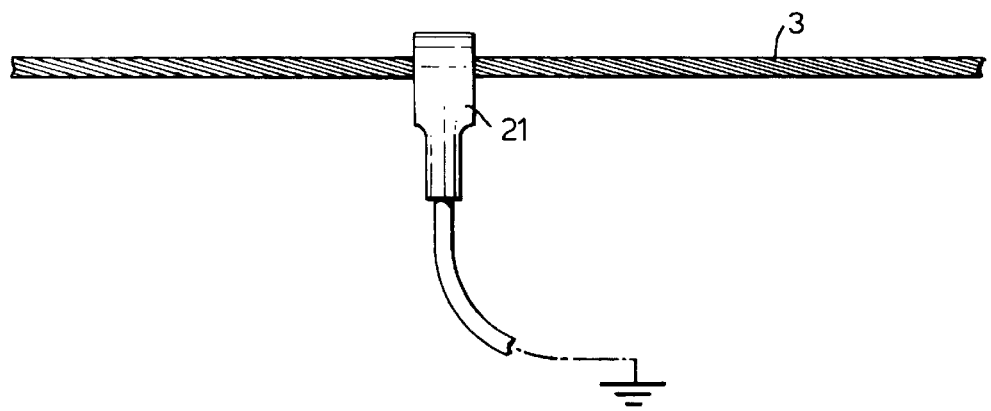
Figure 6:
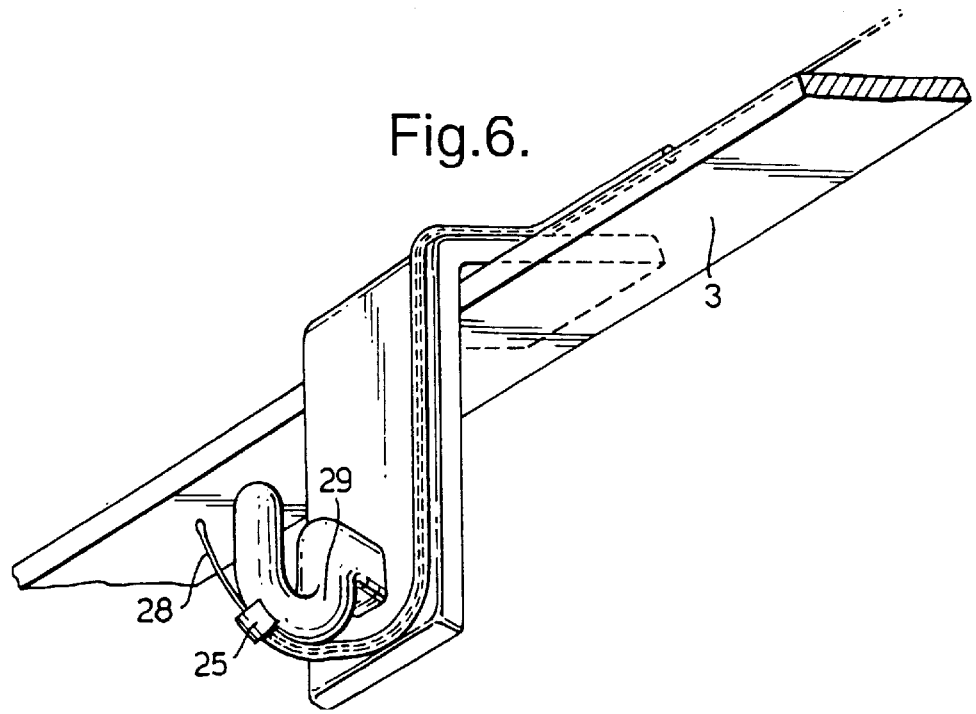
FIG. 6 shows an alternative embodiment of a conductor means in accordance with the second aspect of the invention, in connection with grounding of a high voltage rail.

In FIG. 1, the phenomenon that is the source of the problem to be solved by means of the present invention, is illustrated, namely manual grounding of a high voltage conductor in connection with repair work or similar. The high voltage cable 3 may be located indoor or outdoor, and may be for instance one of three separate phase conductors. In a real case, all three phase conductors must then be grounded separately. In order to provide grounding, a sturdy clamp 21 is attached, the clamp having a conductor with sufficiently large cross section, which conductor is connected to safe earth. The high voltage conductor 3 is not necessarily a cable, but as indicated in FIG. 6, the high voltage conductor may also be a high voltage rail, for instance in an Indoor installation. Such rails will then often be provided with fixed details (29 in FIG. 6) to which specially adapted connector clamps or similar shall be attached.

As previously mentioned, the problem is that service personnel may forget to remove the clamp 21 from the high voltage conductor 3 when leaving the work place. As previously mentioned also, this may have serious consequences, and the invention is directed to providing a safe detection of whether such a clamp 21 is attached or not.

Figure 2:
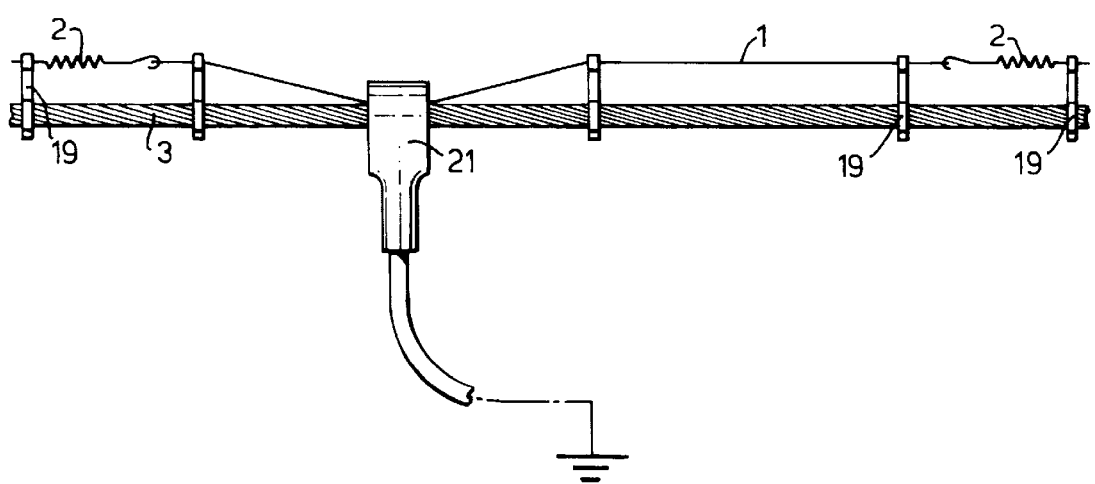
FIG. 2 shows a manually operated attachment corresponding to FIG. 1, however with an added conductor means in accordance with the second aspect of the invention.

FIG. 2 shows a corresponding situation as in FIG. 1, i.e. with an attached grounding clamp 21, but in this case additional equipment has been mounted in advance on the high voltage conductor 3. Along an area corresponding to the actual work area near the high voltage conductor, a naked, thin and metallic conductor wire 1 is suspended by means of isolating distance clips 19. Wire 1 is suspended by means of springs 2 to enable inward flexion of the wire such as shown in the figure.

It is an important point that wire 1 is positioned sufficiently close to the high voltage conductor 3, that clamp 21, when being attached, necessarily also grips over wire I in such a manner that wire 1 is brought to physical and electrical contact with the high voltage conductor 3 when the manual clamp 21 is tightened. Thereby it is ensured that every time a clamp 21 is attached to the high voltage conductor, the naked conductor wire 1 is brought to contact with the high voltage conductor at the same time.

Figure 3:
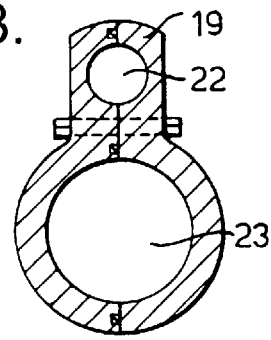
FIG. 3 shows an example of a clip that Is used to hold an additional conductor wire isolated and spaced from a high voltage cable.

It is to be noted that wire 1 is finally terminated at the ends, it is not in contact with other circuits or units, than what is mentioned In the next section. The clips 19 are exemplified in FIG. 3, the opening 23 is adapted so that clip 19, which is made of an insulating material, sits in place with a good grip around the high voltage cable 3, while opening 22 is adapted so that wire I will slide easily through this opening.

Figure 5:
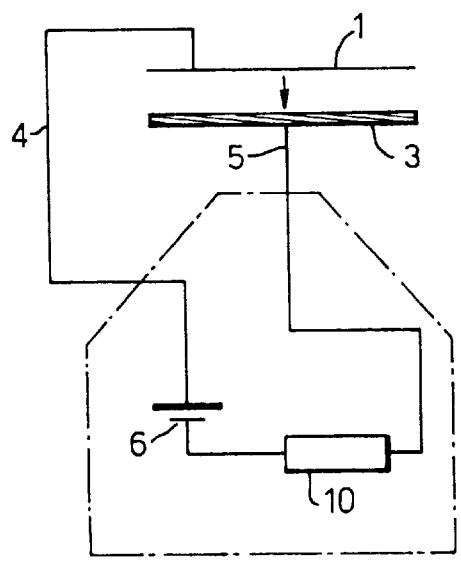
FIG. 5 is a circuit diagram showing the principle of the detection circuit utilized in the system in accordance with the first aspect of the invention.
Figure 4:
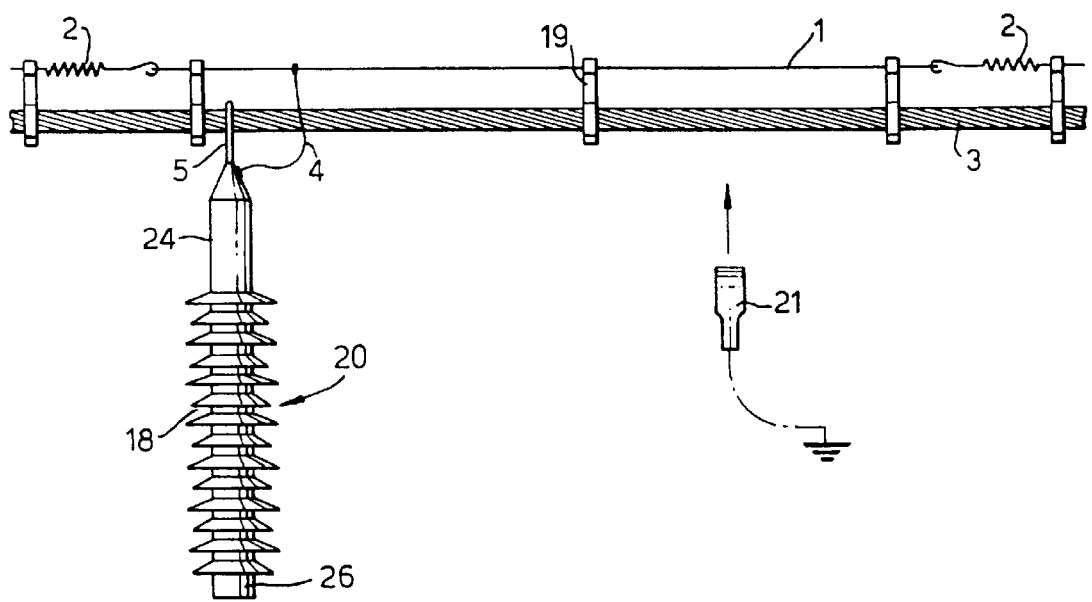
FIG. 4 shows essential parts of the system in accordance with the first aspect of the invention, in a first embodiment.

The system consisting of a conductor wire 1, the high voltage cable 3 and the grounding clamp 21 can be considered to be a simple switch. In FIG. 4, the same units are shown as in FIG. 2, together with a warning device 20. A conductor 4 comes out from the top part of the warning device, which conductor 4 is coupled directly to the metallic additional conductor 1, and a conducting means 5 is connected directly to the high voltage cable 3. The conducting connection means 5 preferably is of such a nature that it provides a good hold for the warning device 20 to the high voltage cable. It is clear that an open electrical circuit from the high voltage cable 3, through connection means 5 into the top part 24 of warning device via a battery 6 inside the warning device top part 24 and further out through connection means 4 to additional conductor 1, can be closed by attaching grounding clamp 21 to the high voltage cable 3, because then the clamp will simultaneously push the naked wire 1 into engagement with high voltage cable 3. Detection of such a contact may then be effected in a simple manner, e.g. by having a light bulb connected in the circuit inside the top part 24 of the warning device 20. FIG. 5 shows an electrical circuit such as just mentioned, in a schematic form. Reference numeral 10 hence refers to a unit that is able to deliver a signal indicating whether the switch system at the top of the figure is in a closed or open position. Unit 10 may be a simple light bulb, see FIG. 9, or unit 10 may represent a separate detection circuit enabling indication of a different signal, in a manner known per se.

Figure 7:
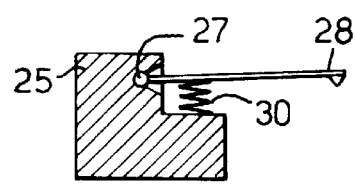
FIG. 7 is a sketch showing another embodiment of a part of a conductor means of the same general type as in FIG. 6.
Figure 8:
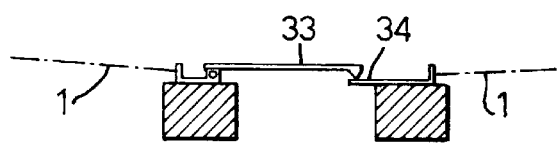
FIG. 8 is a sketch showing a flap/tcounter contact means for closing/opening between extended sections of a conductor means.

It should be noted that the additional conductor 1 may also be of another nature than what appears from FIGS. 2 and 4, see for example FIGS. 6–8. The important point of the additional conductor is that it is arranged so as to provide a switching function In connection with a grounding clamp being in place or not. Such as appearing e.g. from FIG. 6, the additional conductor may in other words be in the form of a flap or stick 28 that can be bent to contact with a mounting detail 29 for a grounding clamp. In such a case as shown in FIG. 6, a conductor clad by insulation has then been carried through to the attachment point 29 for the grounding clamp, and the insulated conductor has been attached to a point 25 that is either provided with a support point and possible springing for movement of flap 28, or point 25 is simply an attachment point for an elastic flap or stick 28. It is important that flap 28 returns to its contactless position when the grounding clamp is removed.

A more general flap embodiment of an additional conductor to provide the desired switch function, is shown in FIG. 7, where reference numeral 27 relates to a support point to which either a connection wire like wire 4 in FIG. 4, can be attached, or that may be situated in the end of a wire that is naked like wire 1, in a situation where there is a combination of cable sections to be safeguarded, and fixed points for grounding clamps. Reference numeral 30 refers to a spring means for flap 28, and reference numeral 25 is an insulated attachment part for the additional conductor/flap 28.

An additional conductor like conductor wire 1 in FIGS. 2 and 4 may also extend along an area where the high voltage conductor is broken by means of disconnecting switches or pantographs, and it may be of interest to have the additional conductor continue past such a disconnecting switch position. In such a case, the additional conductor may be provided with a switching flap 33, having a counter contact 34 such as shown in FIG. 8, where the switching flap is connected to the high voltage disconnecting switch, so that the two are opened and closed together. In this manner the additional conductor 1 may cover a desired length of the high voltage conductor in question.

As mentioned above, the additional conductor appears In several forms, adapted to various types of high voltage conductors and various types of fixed attachment points for manual grounding, various types of such grounding clamps, or as mentioned in the introduction, adapted to a situation without such special attachment points for manual grounding clamps. Thus, there is no "preferred embodiment" regarding the additional conductor, the various embodiments must be adapted to the situation in the work place. However, the assemblies are fixed assemblies, i.e. clips of isolating material are fastened to existing high voltage cables within a work area, and a conductor made of current conducting material, e.g. copper wire, is run through the clips, isolated from the high voltage conductor, however running parallel to and rather close to the high voltage conductor. This off-isolated copper wire is suspended in tension by means of one or several springs, so that it is kept in a taut position all the time. The number of springs 2 depends on the length of the off-isolated conductor 1.

It has been mentioned above, that the warning device 20 in FIG. 4 in its top part 24 (or actually "conductor proximal" part, the part 24 must not necessarily be a top part, but close to the high voltage conductor) contains a part of a detection circuit for detecting whether a grounding clamp 21 has been attached or not, and for delivering a signal to indicate those two states. This signal must be received at a place that is substantially at a ground potential, and the signal must therefore be transmitted without using electrically conducting material between the top part 24 and the receiver location. It is then of course possible to utilize wireless transmission, or possibly fibre optic transmission of a signal from the top part 24 to a remote receiver, i e. remote regarding electrical potential, however rather close, i.e. in practice a distance of a few meters from the high voltage parts. Therefore, in one embodiment of the invention the warning device 20 is divided in two parts, see FIG. 14, where the two parts 20a and 20b correspond to the top part 24 and the bottom part 26, respectively, of warning device 20 in FIG. 4. It seems clear that an optical signal, an acoustical signal or a radio signal can be transmitted from unit 20a that is connected to the high voltage area, to the remote unit 20b located substantially at ground potential. However, normally the high voltage conductor proximal unit 20a (or 24) needs supply of power. Such a supply of power cannot be made via electrically conducting paths, which means that also supply of power to unit 20a (or 24) must be effected in a wireless manner. Such wireless supply of power, i.e. transfer of energy from outside to unit 20a, can then be effected using intense light, transmission of microwaves, or using artificial wind. It is not necessary that this transfer of power takes place from the same unit as unit 20b, the main purpose of which is to receive transmitted signals from unit 20a and pass them further on.

Figure 14:
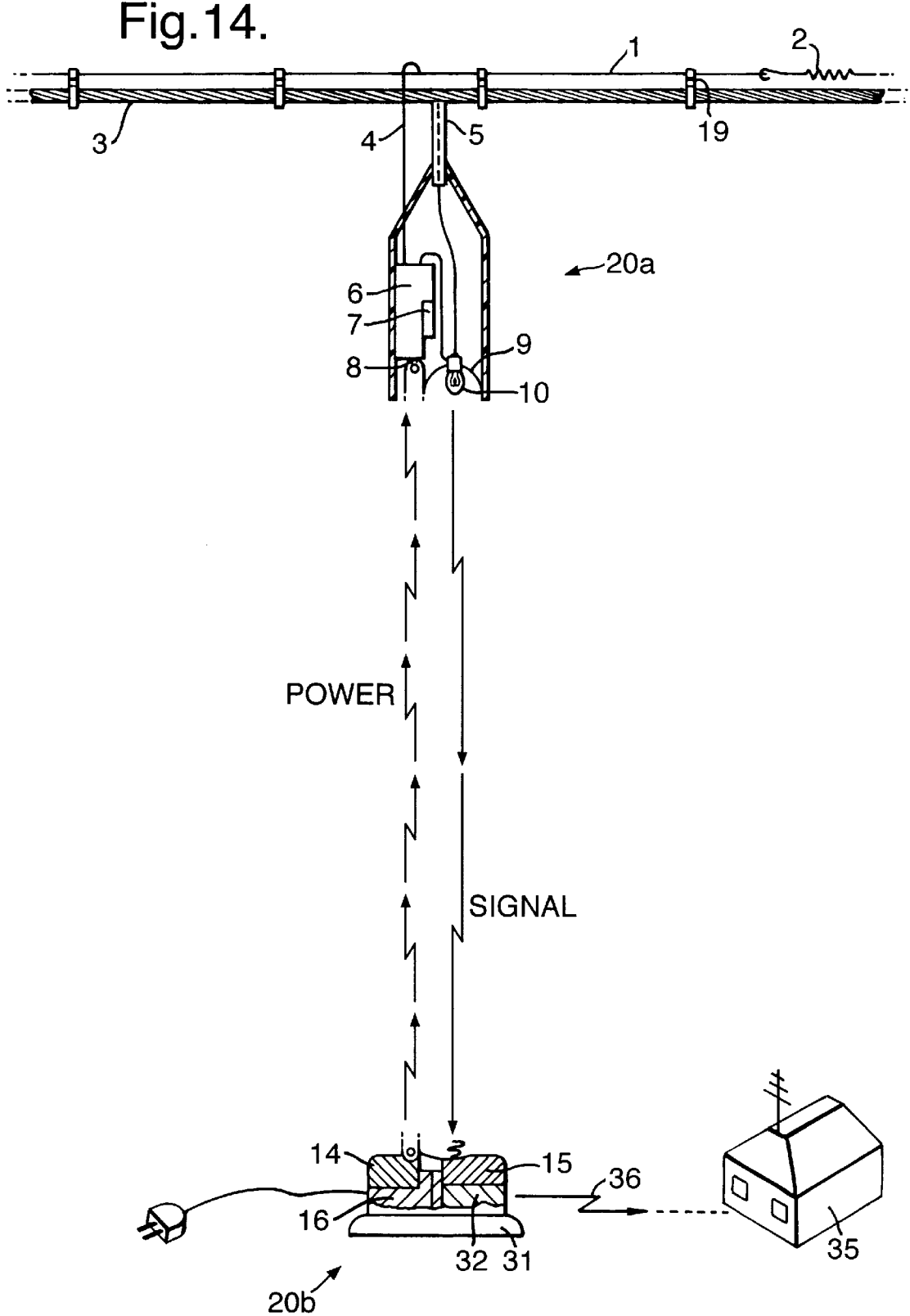
FIG. 14 shows a two-part embodiment of the warning device.

There are reasons that such a two-part embodiment is somewhat less favourable than the preferred embodiment to be described later. In the present surroundings there will easily occur interference that may influence the signal transmission between unit 20a and unit 20b. Radio signals can be distorted in an environment with strong fields, and light signals are subject to "noise" from flood lights, or shadowing from moving persons or objects. However, the purpose can be achieved with such a two-part embodiment as shown in FIG. 14. Besides, in this figure appears such a simple detector circuit including a light bulb 10 as previously mentioned. The light bulb is arranged with a reflector 9 for directing light towards a signal receiver 15 in the form of a photocell, and further the battery 6 is associated with a charger 7 powered from a solar cell means 8 receiving artificial and intense light from e.g. a halogen lamp 14 which in the embodiment shown, is situated In the warning device part 20b distal from the high voltage conductor. Additionally, this warning device part is shown having a base or attachment part 31, a power supply box 16 and a signal transfer unit 32, for delivering a signal 36 to a remote control central 35. Signal type and signal path for signal 36 may be of various types, as mentioned below.

Figure 9:
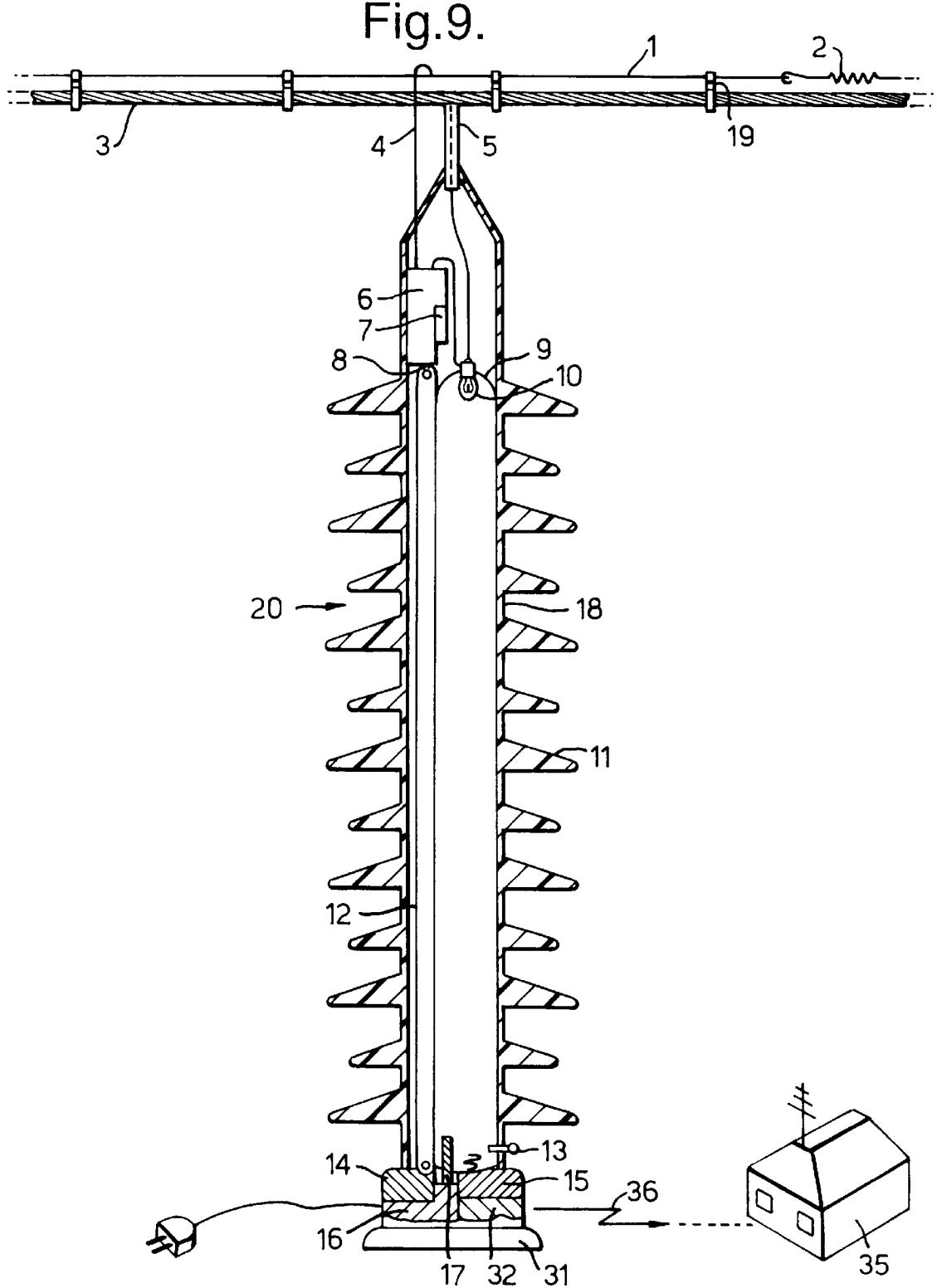
FIG. 9 shows an embodiment of a complete system in accordance with the first aspect of the invention.

However, in FIG. 4 the preferred embodiment of the warning device 20 is shown in a simplified manner. i.e. as an elongate and uninterrupted construction. In FIG. 9, that is similar to FIG. 14 in many respects, there is shown a section through such a warning device 20. Reference numerals mentioned previously have in this figure the same meaning and function as in previously mentioned figures. The warning device 20 has the form of a main body 18 which is a long tube made from an isolating material, and equipped with disc structures in order to maximize the creepage distance. The length of the main body 18 depends on the voltage level in the high voltage Installation in question. In the high voltage conductor distal end of the warning device 20 there are a few units of similar type as already mentioned regarding FIG. 14 and unit 20b. However, In this case the light emitted from the light bulb 10 travels through the inside, open space in tube 18 down to photocell 15, and a signal of a suitable type is transmitted further from the signal transfer equipment 32. This equipment 32 may be a radio transmitter, or there may be a separate line for transmitting an optical or electrical signal to the control central 35, or possibly the transmission path may be via a public or private communication network. There are innumerable solutions in this field, both regarding conversion of the inherently simple two-state signal to an effective form that is suitable for transmission, and regarding the actual transmission to the control central. It is not necessary to describe such techniques further in connection with the is present invention.

Reference numeral 12 designates a tube inside the main tube 18, to separate power supply light from halogen lamp 14, from the much weaker signal light from light bulb 10. As previously mentioned, halogen lamp 14 is intended to supply power to the top part of the warning device, a solar cell means 8 delivering current to a charger 7.

Reference numeral 17 designates a heating element that may be mounted in order to avoid condensation inside the warning device 20. A thermostat 13 is used in connection with heating element 17, Parts 11, 12 and 18 are made from an isolating material, preferably a composite material. Inside the tube space there is air, possibly having a low pressure (vacuum), or possibly a gas of a type having good isolating qualities. Parameters in connection with the gas inside the tube room can be associated with the high voltage level in question. When filling e.g. an isolating gas, for example SF6, the isolating capability can be increased by filling more gas, and the gas pressure of interest can then be determined in dependence of the voltage level. In a similar manner, pumping air out may improve the isolating quality, and the vacuum "strength" can then also be determined in dependence of the voltage level.

Figure 10:
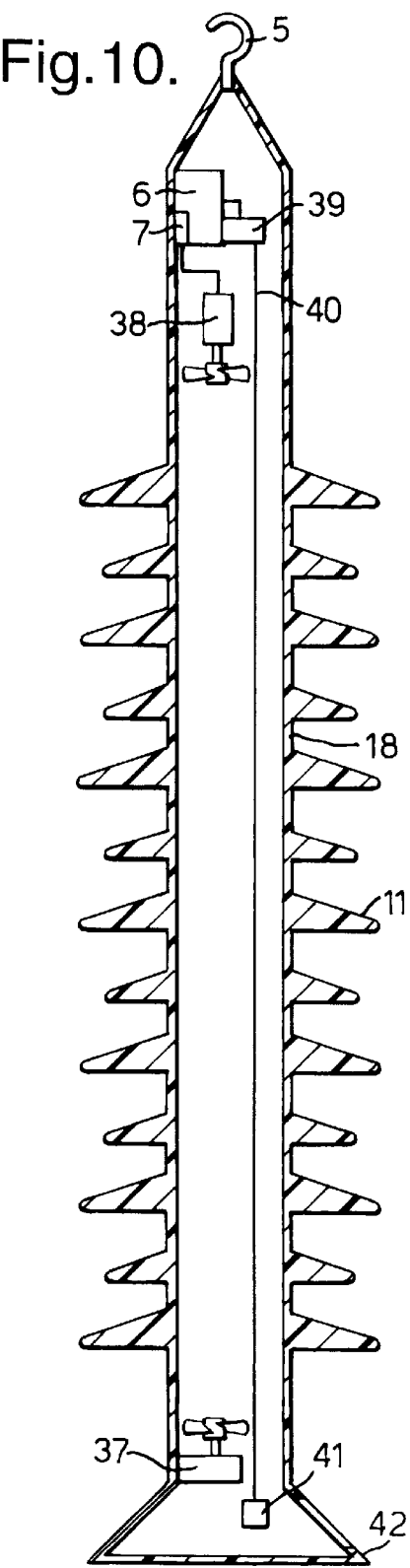
FIG. 10 shows an alternative embodiment of a warning device in accordance with the third aspect of the invention.
Figure 11:
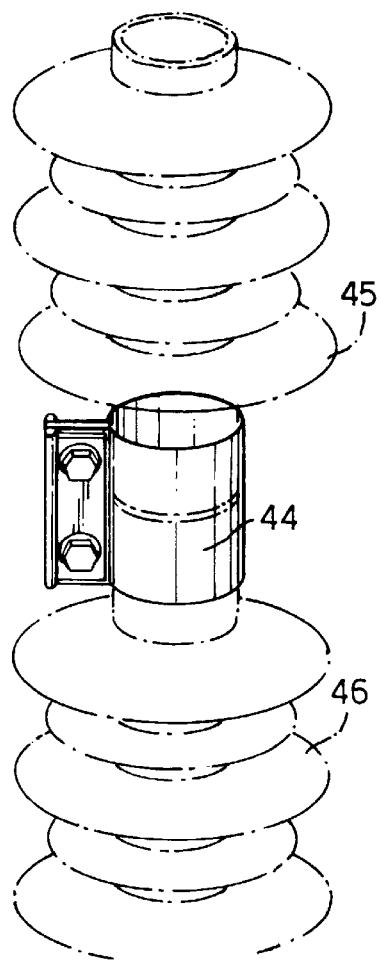
FIG. 11 shows details in connection with a sectioned extension of a warning is device in accordance with the third aspect of the invention.

For high voltage levels, great lengths are needed regarding the tubular main body 18, and it is appropriate to manufacture the main structure in a module form, i.e. in such a manner that it is possible to join together pieces 45, 46 such as shown in FIG. 11, by means of joining clamps 44, In FIG. 10, alternative features appear regarding a an elongate, tubular warning device as shown in FIG. 9. In FIG. 10, the power supply system for the high voltage conductor proximal end has been altered from a light transfer system to a system based on wind. It goes without saying that the inside tube space then must be filled by gas. A fan device 37 blows a gas stream through the tube, causing a windmill means 38 to supply current for the charger means 7. The detection circuit is not shown completely in FIG. 10, only the battery 6 and one connection means 5, in this case shown as a hook. The signalling system utilizes light also in this case, however the light travels through an optical fibre 40, in the form of a signal from an optical transmitter (LED) 39 sending light to an optical receiver 41 in the high voltage conductor distal end of the warning device. The optical signal itself may be just as simple as the signal from light bulb 10 in FIG. 9, i.e. simply light emission or not. Alternatively, some form of modulation can be used. Conversion of the signal received in receiver 41, to a signal that is sent further to the control central 35, is done in accordance with prior art.

Figure 12:
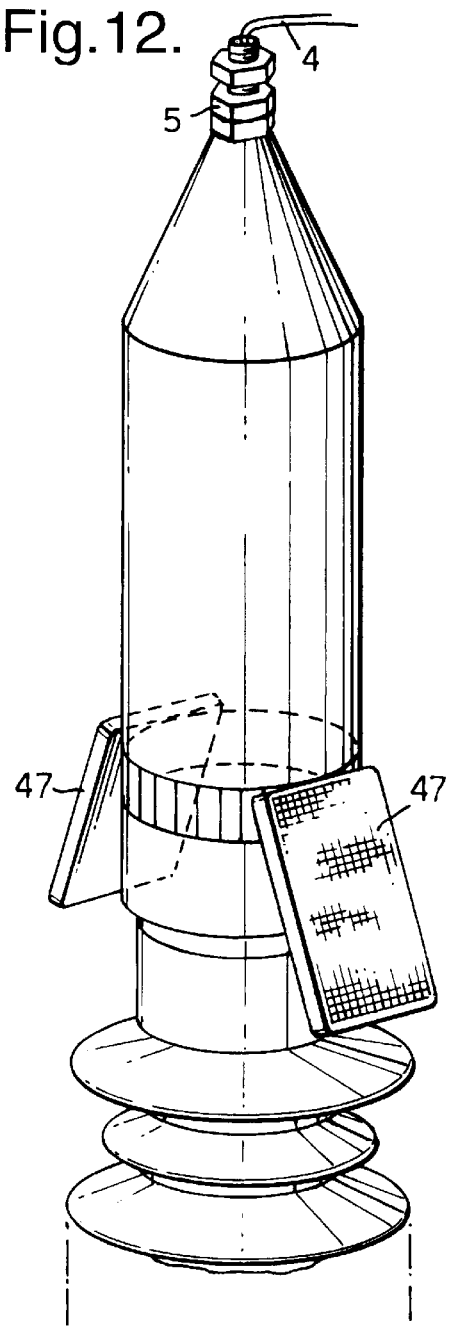
FIG. 12 shows an embodiment with external solar cell means for powering the warning device part proximal to the conductors.

In FIG. 12 appears an alternative manner of providing power for the detection system and the signal emission equipment In the high voltage conductor proximal end of warning device 20, namely in the form of externally arranged solar cell panels 47, of course with wires run in to charger 7 (not shown in FIG. 12). This is a solution that is particularly suitable for outdoor use. Using such external solar cell panels 47, the warning device, that is intended for permanent installation, may possibly do well without such Internal power transfer as mentioned previously.

For the rest, it appears in FIG. 12 that in this case there is shown another form of connection to high voltage rail and additional conductor than in the other embodiments, namely coupling to a special detail by fastening a nut, while a central and isolated lead-through lets out a connection wire 4 to additional conductor 1.

Figure 13:
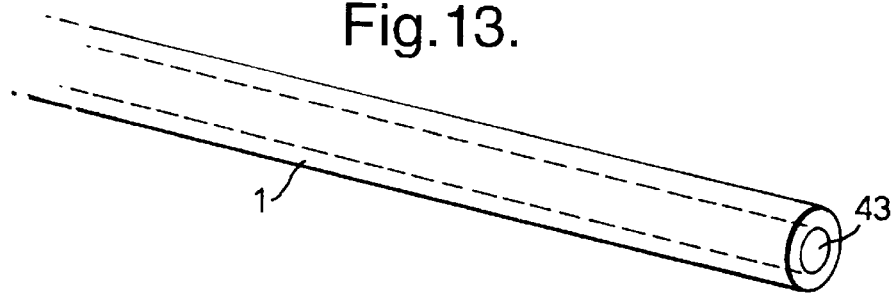
FIG. 13 shows an embodiment of the additional conductor wire that is part of an embodiment of the second aspect of the invention.

As regards the additional conductor 1, there Is also shown in FIG. 13 a special embodiment thereof. Here, an optical fibre 43 is surrounded by a naked metal layer acting as the additional conductor wire 1 shown e.g. in FIG. 2, and the centrally arranged fibre 43 will then provide further options. It will e.g. be possible to detect field strength around the high voltage conductor 3, it will be possible to send signals of optical type along this wire, and it may also be possible to detect downward bend or compression of the additional conductor 1 by measuring light travelling through the fibre. The advantages provided hereby shall not be elaborated on further, but the possibility of using an additional conductor wire of this type, must be mentioned.

Finally, the most important features of the invention shall be repeated: the technical primary characteristics of the invention is that signal transmission and energy transfer between a high voltage area and an area at ground potential level takes place without using electrical conductors, but using for instance light Instead. The actual detection of the presence of a manually attached grounding clamp is executed by means of a simple switch function, using an off-isolated additional conductor that may appear in various embodiments. There is a great freedom of choice as to signal type internally in the warning device, it is possible to use light, radio signals, or possibly sound, and in the case of light, an optical fibre can be used. As regards signal transmission further to a control central, the choice is even more free, since it is possible to use a radio connection, a telephone connection, private lines of electrical or optical type etc. In the preferred embodiment of the warning device, i.e. with an elongate main body having an internal space for transferring energy in one direction and a warning signal in the opposite direction, there is obtained a warning means for manual grounding that is safe to touch, and that can be used both in indoor and outdoor high voltage installations. By changing the length of the main body, the warning device is adapted to any voltage level, and at the same time the body is safe to touch, as previously mentioned. Change or adaptation of length can be achieved by manufacturing the main body in the form of modules.

The charging of the detection circuit battery must not necessarily occur all the time, the charging frequency can be timed e.g. from the power connection box 16, and may possibly be controlled optically from the high voltage conductor proximal end by means of an additional circuit that provides for delivery of a special signal when the battery charge condition reaches a certain level.

Figure 15:
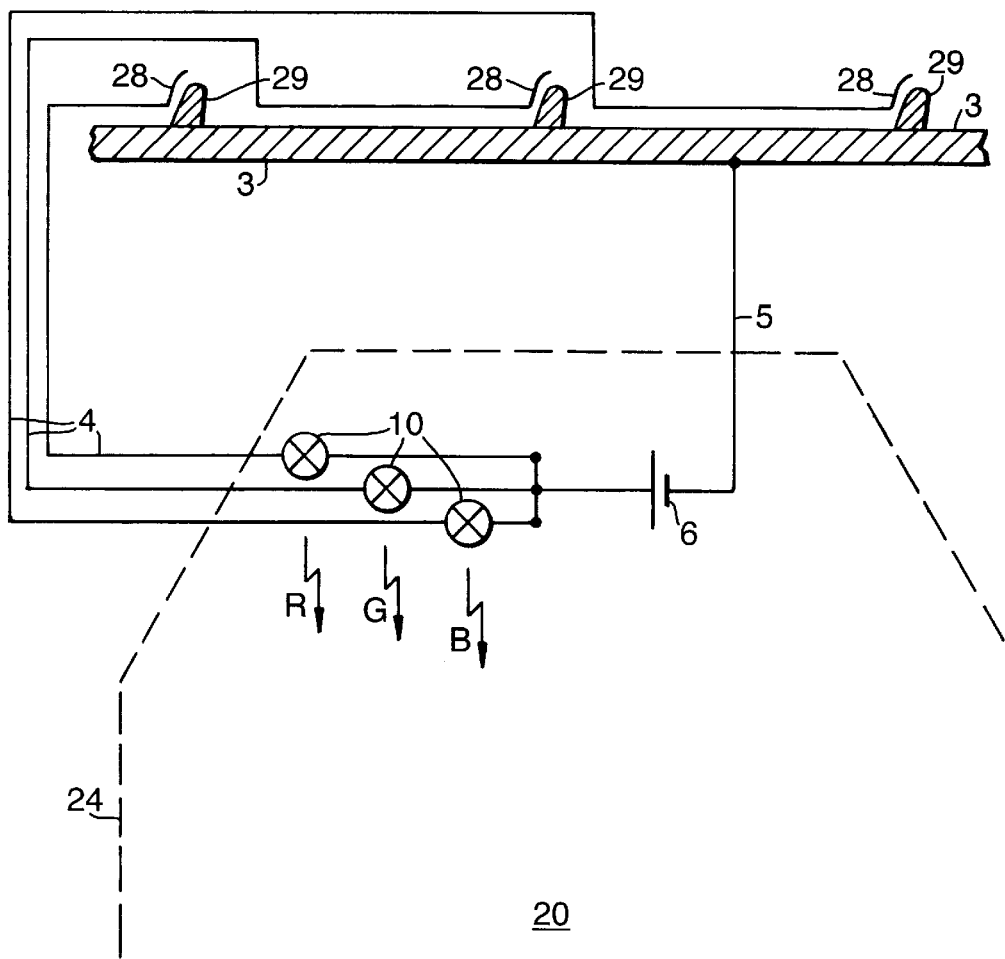
FIG. 15 shows an embodiment with identification of separate attachment positions on a high voltage conductor.

Some of the features mentioned are not mutually exclusive, for instance it is possible to transfer power simultaneously using both light and wind. Similarly, and as previously mentioned, the additional conductor may comprise at the same time both a wire 1 and one or several flaps 28. For the rest, the warning device may be equipped with a virtually unlimited number of id functions for use in situations where there are many fixed attachment points for manual grounding clamps on the same phase conductor. In such a case separate conductors are laid out from the high voltage conductor proximal end 24 of the warning device, to respective flaps 28 at the attachment points, so that several circuits are formed, e.g. like in FIG. 15, and the state of each respective circuit can then be detected separately. In the simple embodiment shown in FIG. 15, the respective light bulbs 10 may emit a different colour, and the light detector that is used In the other end, distinguishes between those colours. It is of course possible to use more advanced circuitry to sense whether each respective circuit is open or closed, and using fibre optical is signal transmission, a light signal from an optical transmitter can be modulated to indicate the state of respective circuits. Such fibre optical transmission of modulated signals is a well known art.

Finally, from the warning device it Is possible to transmit a signal to a control central that at any time is aware of where in the installation, and at what station, manual grounding is presently attached. Hereby, the control central has a tool that makes it impossible to connect high voltage to ground, if interlocking is established for the circuit-breakers in question.

What is claimed is:

1. A system for monitoring and warning regarding the presence of manually operated grounding contacts on high voltage conductors, characterized by an additional conductor (1) arranged close to and along at least part of a high voltage conductor (3) of interest, and adapted to be brought to physical/electrical engagement with said high voltage conductor (3) when a manually operated grounding contact is attached, said additional conductor (1) otherwise being fastened in an isolated manner relative to said high voltage conductor;

a two-part, or elongate and externally isolated warning device (20; 20a, 20b) having a high voltage conductor proximal and a high voltage conductor distal warning part (20a, 20b) or end, said warning device being connected to both said high voltage conductor (3) and said additional conductor (1) in its conductor proximal warning part (20a) or end, and said warning device being adapted for optical or wireless transmission to said distal warning part (20b) or end, of a signal indicating possible physical/electrical engagement; and signal transmission equipment (32) for transmitting said signal or a processed form thereof, from said distal warning part (20b) or end to a monitoring central (35).

2. Conductor means for detecting, in co-operation with a warning device (20; 20a, 20b), an attached manually-operated grounding contact on an existing high voltage conductor (3), characterized in that said conductor means includes an additional conductor (1) arranged close to at least part of said high voltage conductor (3), said additional conductor (1) being fastened in an isolated manner relative to said high voltage conductor, and being adapted to be brought to physical/electrical engagement with said high voltage conductor (3) when a manually-operated grounding contact is attached thereto.

3. Conductor means in accordance with claim 2, characterized in that said additional conductor is a wire (1) parallel to said high voltage conductor (3) and suspended by means of springing (2) in at least one of its ends.

4. Conductor means in accordance with claim 3, characterized in that said additional conductor (1) has a length adapted to a work area of interest, where manually-operated grounding contacts are used.

5. Conductor means in accordance with claim 2, characterized by a number of isolating clips (19) mounted on said high voltage conductor (3) in order to maintain a distance between and isolate between said high voltage conductor and said additional conductor, said additional conductor (1) passing through an opening (22) in each clip (19).

6. Conductor means in accordance with claim 2, characterized in that said additional conductor (1) also includes a multi-use optical fibre core (43), for instance for signalling, for detecting field strength around the high voltage conductor (3) and/or for detecting downward bend and/or compression of the additional conductor (1), by optical end detection.

7. Conductor means in accordance with claim 2, wherein said high voltage conductor is a rail (3) having at least one special attachment detail (29) for receiving a manually-operated grounding contact, characterized in that said additional conductor includes a spring-suspended flap (28) fastened in an isolating manner to said attachment detail (29), so that a flap section can be clamped to physical/electrical engagement with said detail (29) when a manually-operated grounding contact is attached, said flap (28) being fixedly supported in a bolt (27) enabling electrical connection for a connection means (4) of a warning device (20), or for an extension part of said additional conductor (1).

8. Conductor means in accordance with claim 2, characterized in that it includes at least one wire section (1) along at least one elongate part (3) of a high voltage conductor, and at least one spring-suspended flap (28) arranged at at least one attachment detail (29) on the same high voltage conductor.

9. Conductor means in accordance with claim 2, including wire sections (1) in mutual extension along a high voltage conductor (3) which is also sectioned by disconnecting switches or pantographs, characterized in that said disconnection switches/pantographs are equipped with isolatingly arranged flap/counter contact devices (33, 34) for corresponding contact closing/opening for the additional conductor sections (1), as for the associated high voltage conductor sections (3).

10. A warning device, adapted to be mounted to a high voltage conductor (3) for warning regarding possible presence of a manually-operated grounding contact, characterized in that said warning device (20; 20a, 20b) is in two parts, or is elongate and externally Isolated, and has a high voltage conductor proximal end or warning part and a high voltage conductor distal end or warning part (20a, 20b);

has means (5, 4) for connection to said high voltage conductor (3) as well as to an additional conductor (1) arranged close to said high voltage conductor (3), at said high voltage conductor proximal end or warning part (20a); and has means (6–10, 15) for generating, and optical or wireless transmission of, a signal indicating engagement between said high voltage conductor (3) and said additional conductor (1), from said high voltage conductor proximal to said distal end or warning part (20b), said distal end or warning part (20b) including a signal transmission unit (32) for communication with a monitoring central (35).

11. Warning device in accordance with claim 10, characterized in that it has a tubular main body (18) with external disk structures (11) to increase creepage distances.

12. Warning device in accordance with claim 11, characterized in that said main body (18) consists of a number of similar modules (45, 46) that can be mutually joined to provide a desired length, said length being adapted in accordance with the normal voltage level of said high voltage conductor (3), and according to outdoor or indoor location.

13. Warning device in accordance with claim 11, characterized in that said main body (18) internally has at least one elongate room extending from the conductor proximal end to the distal end thereof.

14. Warning device in accordance with claim 13, characterized in that said at least one elongate room is filled by an inert and electrically isolating gas, having a gas pressure adjusted in accordance with the normal voltage level of said high voltage conductor (3).

15. Warning device in accordance with claim 14, characterized in that the gas is transparent to light to be transmitted internally in said main body (18).

16. Warning device in accordance with claim 13, characterized in that said at least one room has an underpressure (vacuum), with a pressure adjusted in accordance with the normal voltage level of said high voltage conductor (3).

17. Warning device in accordance with claim 10, characterized in that said connection means comprise
a first connection means (5) for connection to said high voltage conductor (3);
a second connection means (4) for connection to said additional conductor (1); and that
said means (6–10, 15) include a signal generator (10) operative to deliver said optical or wireless signal indicating if an electrical circuit including a voltage source (6) and both of said connection means (4, 5) in series, is closed or not.

18. Warning device in accordance with claim 17, characterized in that said voltage source is a DC battery (6).

19. Warning device in accordance with claim 18, characterized in that said battery (6) is rechargeable and connected to a recharging generator (7, 8) run by power received wirelessly and internally through said warning device (20) from the distal end thereof.

20. Warning device in accordance with claim 19, characterized in that said recharging generator includes a solar cell device (8) for receiving light from a strong lamp (14) arranged internally in the distal end of said warning device.

21. Warning device in accordance with claim 20, characterized by a special tube (12) arranged internally in said warning device (20) and between said lamp (14) and said solar cell device (8), for transmission, screening off and concentrating said light.

22. Warning device in accordance with claim 19, characterized in that said recharging generator Includes a windmill (38) that is driven by an air or gas stream provided by a fan (37) arranged internally in the distal end of said warning device.

23. Warning device in accordance with claim 19, characterized in that said recharging generator includes solar cell means (47) arranged on the outside of said conductor proximal end, preferably for outdoor use.

24. Warning device in accordance with claim 10, characterized in that said means include a signal receiver (15) for receiving said signal, said receiver (15) being connected to said signal transmission unit (32).

25. Warning device in accordance with claim 24, characterized in that said signal receiver is a photo cell (15;41), said signal being a light signal.

26. Warning device in accordance with claim 25, characterized in that an optical fibre (40) is arranged between said photo cell (41) and a light transmitter (39) in the conductor proximal end of said warning device, for transmission of said signal from said light transmitter (39) to said photo cell (41).

27. Warning device in accordance with claim 25, characterized in that an open space is arranged between said photo cell (15) and a light transmitter (10) in the conductor proximal end of the warning device, for transmitting said signal from said light transmitter (10) to said photo cell (15).

28. Warning device in accordance with claim 27, characterized in that said light transmitter is a light bulb (10) included in an electrical circuit (1, 3, 4, 5, 6, 10) that is open or closed in dependence of whether said engagement occurs.

29. Warning device in accordance with claim 24, characterized in that said distal end further includes a power supply unit (14) for transferring power to the signal generating and transmission means (6–10) in the conductor proximal end.

30. Warning device in accordance with claim 29, characterized in that said power supply unit is a strong halogen lamp (14).

31. Warning device in accordance with claim 29, characterized in that the power supply unit is a fan (37).

32. Warning device in accordance with claim 29, characterized in that the power supply unit (14) in the distal end of said warning device is connectable to an external power supply network.

33. Warning device in accordance with claim 11, characterized in that said distal end is equipped with external base or attachment means (42).

34. Warning device in accordance with claim 11, characterized in that it is equipped internally in its distal end with a heating element (17) and a thermostat (13) to avoid condensation.

35. Warning device in accordance with claim 10, characterized in that said signal transmission unit (32) is operative to convert the signal to be forwarded from the distal end or warning part (20b), to a form adapted for external communication.

36. Warning device in accordance with claim 10, characterized in that the high voltage conductor proximal warning part (20a) has a receiver (8) for power transferred in a wireless manner, preferably from said distal warning part (20b), in the form of electromagnetic waves, sound or wind, for recharging an operation battery (6) in the proximal warning part (20a).

37. Warning device in accordance with claim 10, characterized in that the distal warning part (20b) is equipped with a transmitter (14) transmitting energy to said high voltage conductor proximal warning part (20a) in the form of electromagnetic waves, sound or wind.

38. Warning device in accordance with claim 10, characterized in that
said additional conductor connection means (4) is branched off to a number of attachment points (29) for manually-operated contacts on said high voltage conductor (3); and that
said signal generating and transmission means (6, 10, 15) are operative to generate and transmit signals identifying the grounding state of respective attachment points (29).

39. A method for monitoring and warning regarding the presence of manually-operated grounding contacts on high voltage conductors,
characterized in that
an additional conductor (1) having a limited length, is arranged close to at least part of a high voltage conductor (3) of interest, and is fastened in an isolated manner relative to said high voltage conductor;
in a high voltage conductor proximal warning part (20b) or proximal end of a two-part or elongate and externally isolated warning device (20; 20a, 20b), there is provided a connection (4, 5) to said high voltage conductor (3) and to said additional conductor (1);
when said manually-operated grounding contact is attached to said high voltage conductor (3), said additional conductor (1) is clamped to engagement with said high voltage conductor (3), whereby a signal is generated and transmitted optically or wirelessly in said warning device (20) from said high voltage conductor proximal warning part (20a) or proximal end, to a warning part (20b) or end distal from said high voltage conductor (3); and
a signal transmission equipment (32) arranged in said distal warning part (20b) or distal end of said warning device (20), sends said signal further to a monitoring central (35), possibly in a converted form.

\* \* \* \* \*